United States Patent [19]
Addison

[11] Patent Number: 6,119,620
[45] Date of Patent: Sep. 19, 2000

[54] KAYAK WITH RELEASE LOUVERS

[76] Inventor: Corran Addison, 100 Ave. de la Marquise, Beauport, Quebec, Canada, G1E 1S7

[21] Appl. No.: 09/304,454

[22] Filed: May 3, 1999

Related U.S. Application Data

[63] Continuation-in-part of application No. 09/195,953, Nov. 18, 1998, abandoned.

[51] Int. Cl.⁷ ...................................................... B63B 35/71
[52] U.S. Cl. .......................................... 114/347; 114/271
[58] Field of Search ..................................... 114/271, 291, 114/347

[56] References Cited

U.S. PATENT DOCUMENTS

| | | | |
|---|---|---|---|
| 3,974,790 | 8/1976 | Oldenburg | 114/291 |
| 5,042,416 | 8/1991 | Arcouette | 114/347 |

*Primary Examiner*—Jesus D. Sotelo
*Attorney, Agent, or Firm*—Swabey Ogilvy Renault; Guy J. Houle

[57] ABSTRACT

A kayak comprising a hull and a deck with one or more louvers provided in said hull at least in a stern section thereof to force water to separate from said hull whereby forming voids which are replaced with air from the water surface or water from the sides as said kayak is displaced thereon. This reduces drag and the kayak benefits from a speed improvement.

10 Claims, 5 Drawing Sheets

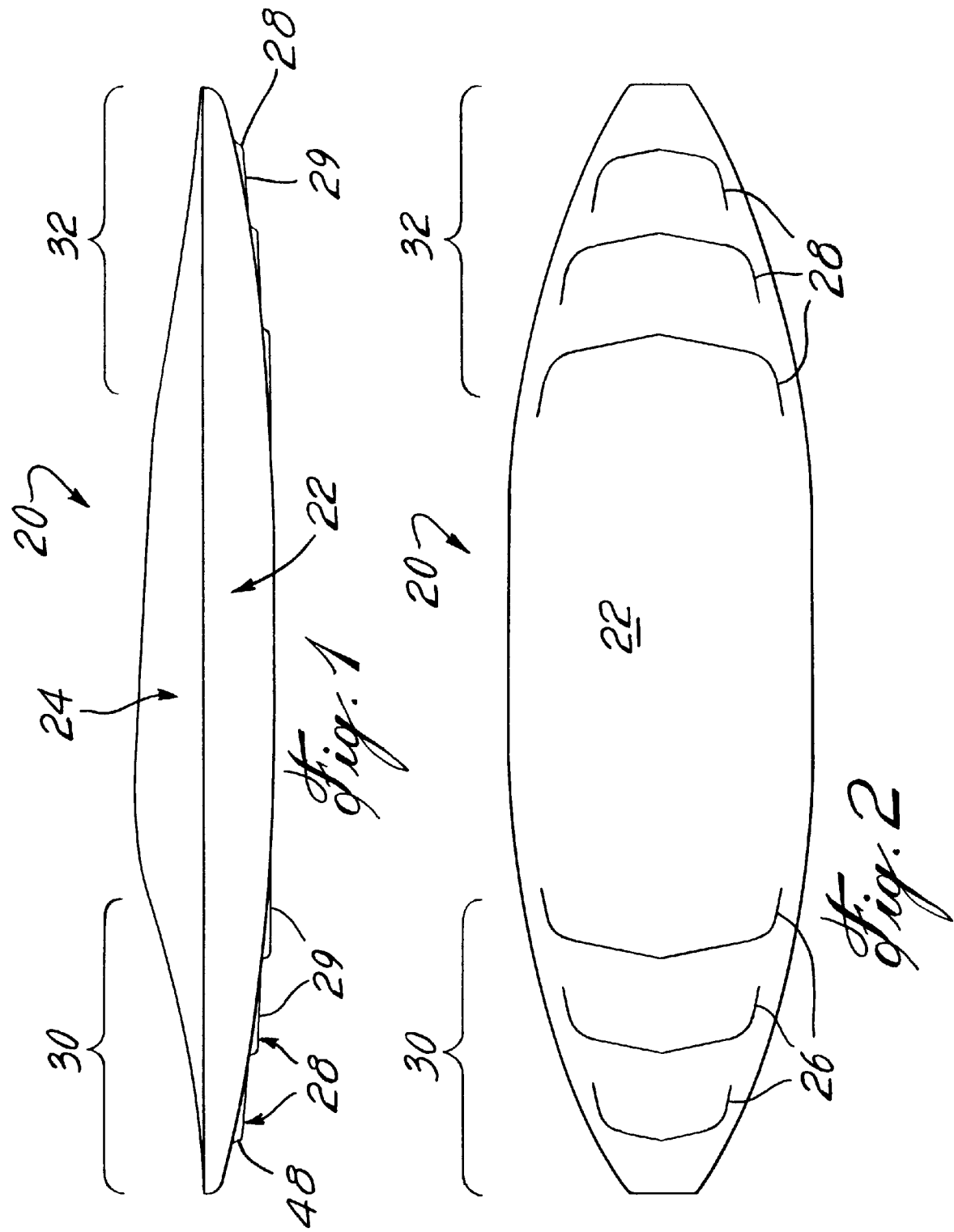

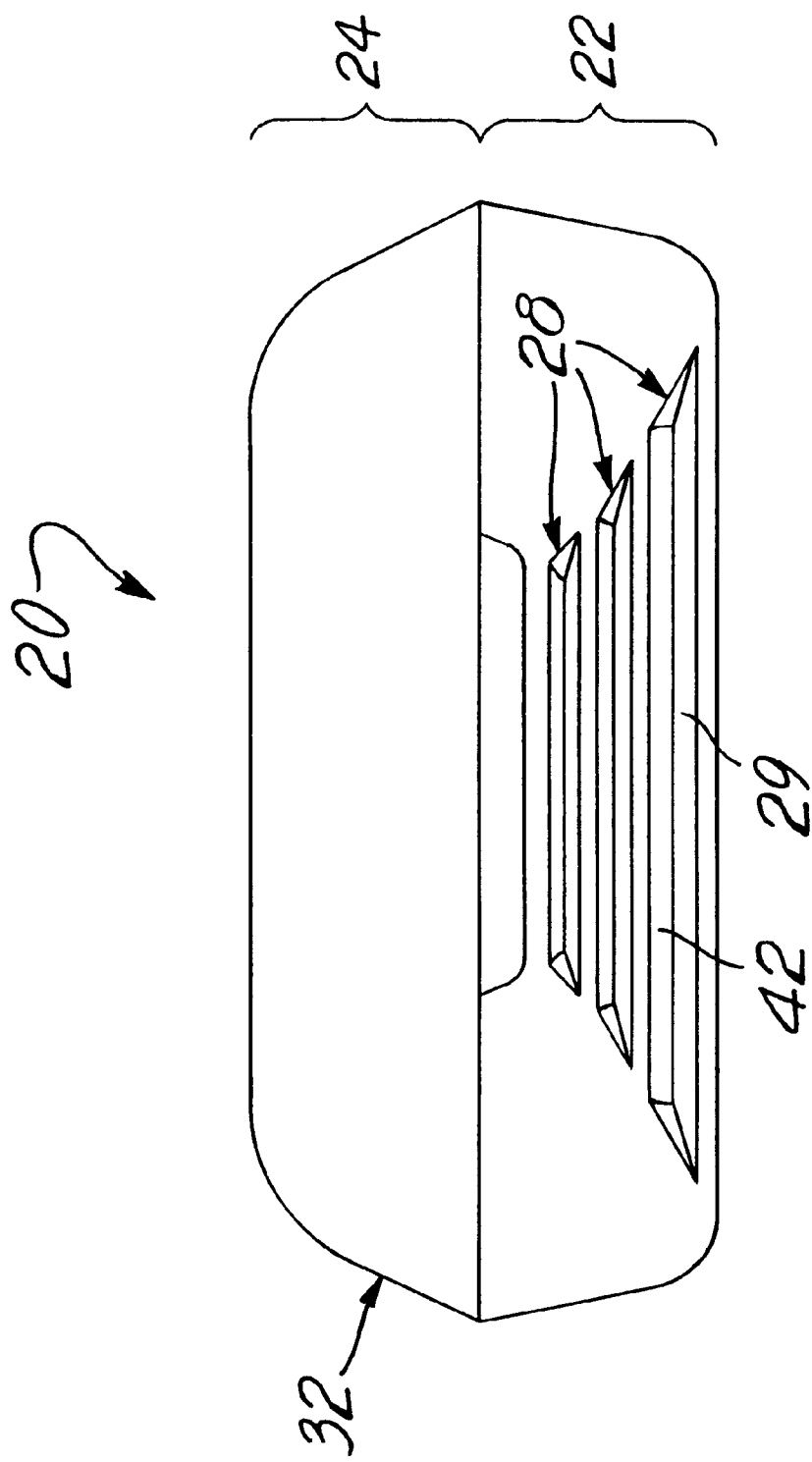

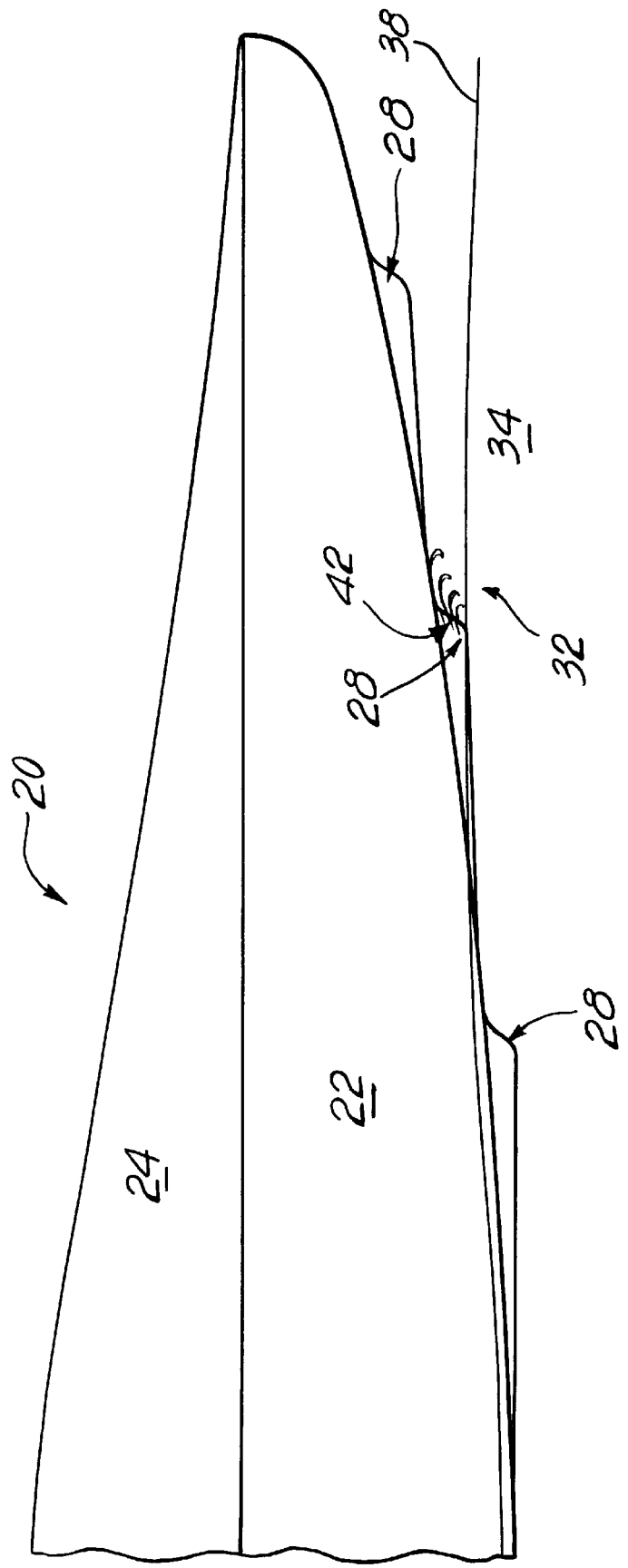

KAYAK WITH RELEASE LOUVERS

CROSS-REFERENCE TO RELATED APPLICATION

This application is a continuation-in-part of Application Ser. No. 09/195,953, filed Nov. 18, 1998, and now abandoned.

BACKGROUND OF THE INVENTION

1. Field of the Invention

The present invention relates to a water vehicle and in particular to a kayak having a louvered rockered hull which improves the speed and maneuverability of said kayak.

2. Description of the Prior Art

Two most important aspects of a kayak are its speed and maneuverability. Speed or maneuverability but not both is a common trade-off associated with kayaks. Speed is an issue as kayaks are propelled on water by the occupant with the use of a paddle.

In the case of a whitewater kayak; maneuverability is more important than speed. For this reason whitewater kayaks have a significantly rockered hull. The rockered hull has high profile ends which increase its turning ability leading to increased maneuverability. Whitewater kayaks are said to have displacement hulls that are very close to planing hulls. Nonetheless, fast whitewater kayak are sought after.

Several aspects affect the forward speed of a kayak:

- the energy required to displace the water at the leading end of the kayak,
- how the molecules travel along the length of the hull,
- how water returns to its original position once the kayak has passed by, and
- the amount of wetted surface area.

Thus energy conservation is important when considering the motion of a kayak through water.

The energy required to displace a water molecule can be significantly reduced by increasing the waterline of the kayak. By increasing the length of the hull, the displacement of the water molecule to its final position can be spread over a greater distance. This modification has to be weighed against the resulting increase in the effective wetted surface area of the kayak coming from the increase in length. This increase in the waterline could slow the kayak down if the induced drag by the wetted surface area is disproportional to the increased effectiveness of displacement.

Another feature of the kayak that affects the motion of water molecules past the kayak is the profile of its bow at the moment of entry. A sleeker bow is more efficient at moving the molecules to the side, but it also increases resistance to sideways movement of the kayak which reduces the kayak's turning ability. Similarly a sleeker stern is more efficient in guiding the movement of the water molecules as they return to their original position, but as above mentioned, it also reduces the kayak's turning ability. A rockered bow and stern allows the kayak to turn easier but, at the same time, this shortens the effective waterline length of the kayak thereby offering a less effective profile for displacing water.

It would be advantageous to provide whitewater kayaks with speed enhancing features.

SUMMARY OF THE INVENTION

The present invention deals with the reduction of the drag induced by the adhesion of water molecules to the hull of a kayak at its trailing end. This reduction in drag is accomplished by providing one or more release louvers in the trailing section of a hull.

It is a feature of the present invention to provide a small louver or a plurality thereof which effectively forces the water molecules to separate from the hull of a kayak at the lip of the louver.

According to the present invention there is provided, a kayak comprising a deck and a rockered hull, the rockered hull further comprising at least a release louver provided under said rockered hull at least in a stern portion thereof; to force water to separate from the rockered hull to form voids which are filled with either air from the water surface or from water from the sides of the kayak as the kayak is displaced thereon.

BRIEF DESCRIPTION OF THE DRAWINGS

The present invention will be better understood by way of the following detailed description of a preferred embodiment shown in the appended drawings in which:

FIG. 1 is a side view of a kayak in which the hull is provided with speed enhancing louvers;

FIG. 2 is a bottom view of a kayak provided with speed enhancing louvers in the stern and bow sections of the hull;

FIG. 3 is a stern end view of the kayak shown in FIG. 2;

FIG. 4b is a fragmented side view, similar to FIG. 4a, illustrating the reduction of the adhesion of the water to the hull by providing release louvers in the stern section of the hull;

DETAILED DESCRIPTION OF THE INVENTION

Figure 4A:
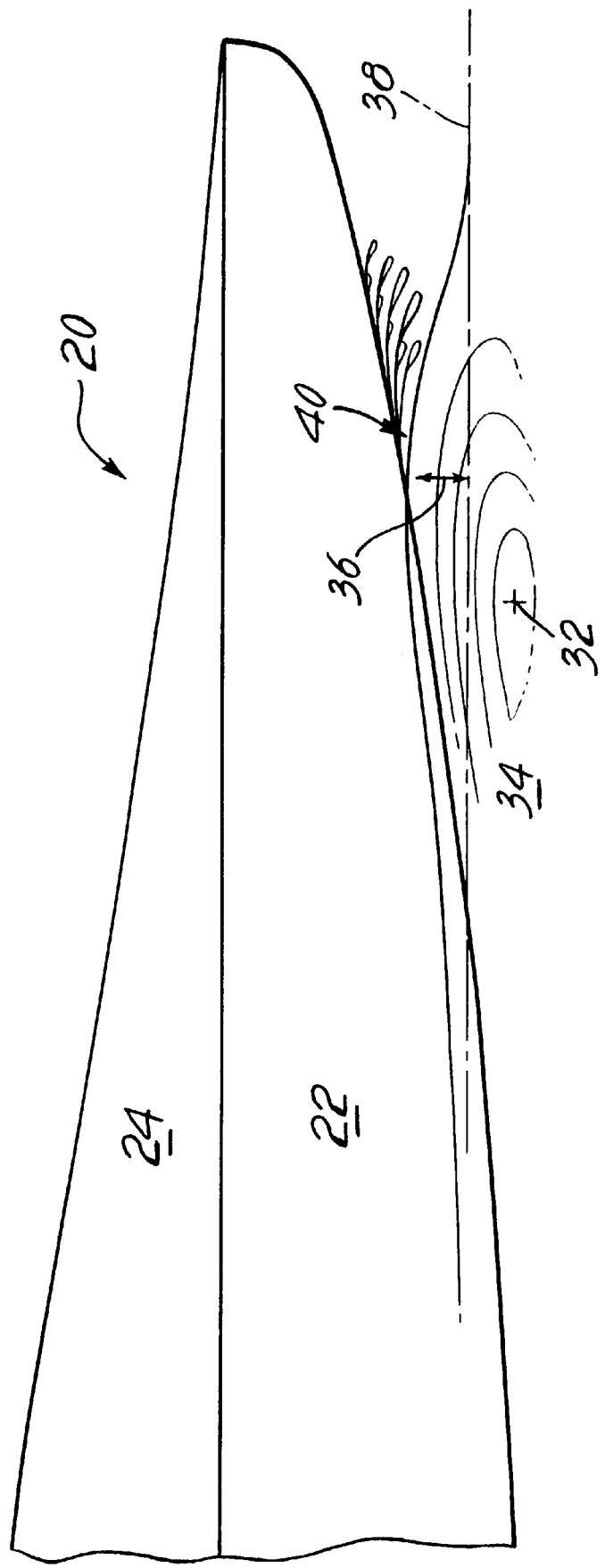
FIG. 4a is a fragmented side view of the stern section o the Kayak illustrating the adhesion of water to the hull of the kayak in the stern section.

According to a preferred embodiment of the present invention and as shown in FIG. 1, there is shown a kayak provided with a rockered hull 22. A deck section 24 is secured on the hull 22. Release louvers 26 and 28 are formed in a bow 30 and a stern 32 section of the hull 22, respectively.

FIG. 2 shows the hull 22 of the kayak 22 with the release louvers 26 and 28 mounted in the bow 30 and the stern 32 section, respectively. As shown the release louvers 28 are curved convexly from the center of the hull.

FIG. 3 shows the release louvers 28 on the stern section 32 of rockered hull 22 to have a substantially flat stepped projection defining a flat planning wall 29 and a lip 42, it is important that the lip define an abrupt change in the shape of the planning wall 29.

FIGS. 4a and 4b illustrate the functionality of the release louvers 28 provided on the rockered hull 22.

As the kayak 20 passes over the displaced water 34, the displaced water 34 under and on the side of the hull 22 is forced to raise, as shown at 36, to above its original position, as shown at 38, as a cohesive force makes it adhere to the skin of the hull, as shown at 40. This adhesion of water molecules to the hull 22 is illustrated in FIG. 4a.

The kayak 20 leaves a water depression behind which must be filled as the kayak advances. The release louvers 28 provided on the rockered hull 22 in the stern section 32 allow air from the surface or water from the sides to fill the void left by the advancing kayak 20, that is traditionally filled by rising water molecules from below 36, and forces the water 34 to separate cleanly and quickly from the trailing lip 42 of a release louver 28 as the kayak 20 moves forward. The separation at the lip 42 takes place due to the abrupt change in the planning surface 29 at the lip 42 of the release louver 28. The separation of water molecules from the hull 22 is illustrated in FIG. 4b. The separation of water 34 significantly reduces the effect of the adhesion of water molecules to the hull 22, reduces the wetted area of the kayak 20 and therefore reduces the drag on the kayak 20. The kayak 20 then benefits from an enhanced speed.

Figure 5A:
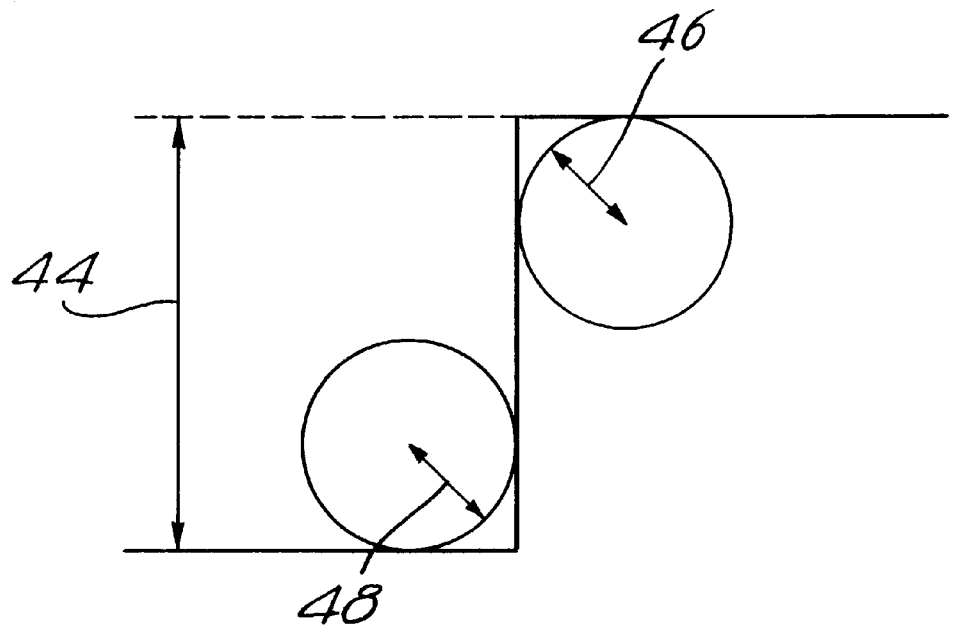
FIG. 5a is a diagram which illustrates the important parameters of the release louvers and in particular the sharpness of the release louvers' features.
Figure 5B:
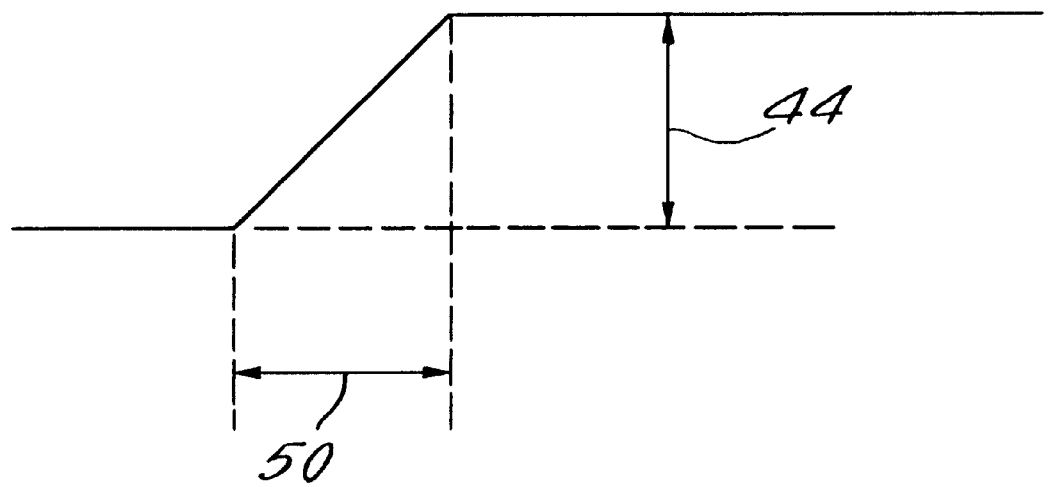
FIG. 5b is a diagram which illustrated the important parameters of the release louvers and in particular the width of the profile of the release louvers.

Specifically several factors, shown in FIGS. 5a and 5b, must be met in order for the release louvers 28 to function effectively:

- each release louver should have a height 44 between ⅛ inch or greater,
- the louvers must be confined to the last 25% of the kayak's total length,
- the bevel radius 46 combined with the radius of flare 48 must be less than 100% of the total height of the release louver 44. In addition, none of the radii should be greater than 50% of the release louver's total height 44,
- the width 50 of the release louver's should be no more than three times its height 44.

There is no requirement for the number of release louvers 28 used. Generally the number and location of the release louvers 28 along the stern section 32 of the rockered hull 22 will depend on the following factors: the amount of rocker present, the length of the kayak, the weight of the kayak 20 and the weight of the occupant, and the top desirable speed. Together these factors determine the water level 38 on the kayak on a body of water and the location of the release louver as planning is achieved.

Although only release louvers 28 curved convexly from the center of the hull 22 are shown in FIG. 2, the overall shape of the release louvers 28 does not influence the separation of water from the hull. The release louvers 28 can be curved convexly from the center of the hull 22, curved concavely from the center of the hull 22 or perpendicular to the longitudinal axis of the kayak 20 achieving the same effect of reducing the wetted area of the kayak 20 and therefore reducing drag. Stability of the kayak 20 is affected by the overall shape of the louvers and a kayak can have different stability characteristics at different speeds according to the shape of the release louver at which water separates at that particular speed or range thereof.

As shown in FIG. 2, release louvers 26 are also provided in the bow section 30 of the hull 22 of the kayak 20 and these break up water when the kayak 20 is in motion to create turbulent flow whereby reducing cohesive tension on the hull and reducing drag.

In conclusion, with these louvers, at least in the stern section of the hull, drag is diminished thereby making it easier to maneuver the kayak on a body of water and to achieve an increase in speed.

I claim:

1. A kayak comprising a hull and a deck, said hull having a stem and bow section, one or more release louvers provided in said hull in at least one of said stem or bow sections to force water to separate from said hull and to form voids which are replaced with air above the water surface as said kayak is displaced thereon to reduce drag on said hull, said hull having a longitudinal axis with said release louvers formed perpendicular to said longitudinal axis and curved convexly towards said one of said stem or bow sections.

2. A kayak as claimed in claim 1, wherein at least one of said release louvers is curved concavely towards the center of the hull.

3. A kayak as claimed in claim 1, wherein each of said one or more release louvers defines a lip, said lip having a height of from about ⅛ inch or greater.

4. A kayak as claimed in claim 3, wherein said lip is an angled wall having a width which is no more than three times said height.

5. A kayak as claimed in claim 1, wherein each of said one or more release louvers are provided in both a bow section and said stern section of said kayak.

6. A kayak comprising a hull and a deck, said hull having a stem and a bow section, one or more release louvers provided in said hull in at least one of said stem or bow sections to force water to separate from said hull and to form voids which are replaced with water from the sides of said kayak as said kayak is displaced thereon to reduce drag on said hull, said hull having a longitudinal axis with said release louvers formed perpendicular to said longitudinal axis and curved convexly towards said one of said stem or bow sections.

7. A kayak as claimed in claim 6, wherein at least one of said release louvers is curved concavely towards the center of the hull.

8. A kayak as claimed in claim 6, wherein each of said one or more release louvers defines a lip, said lip having a height of from about ⅛ inch or greater.

9. A kayak as claimed in claim 8, wherein said lip is an angled wall having a width which is no more than three times said height.

10. A kayak as claimed in claim 6, wherein each of said one or more release louvers are provided in both a bow section and said stern section of said kayak.

* * * * *